(12) United States Patent
Bell

(10) Patent No.: US 8,561,573 B2
(45) Date of Patent: Oct. 22, 2013

(54) LITTER BOX ODOR DEVICE

(76) Inventor: Dean Michael Bell, Federal Way, WA (US)

( * ) Notice: Subject to any disclaimer, the term of this patent is extended or adjusted under 35 U.S.C. 154(b) by 35 days.

(21) Appl. No.: 13/425,718

(22) Filed: Mar. 21, 2012

(65) Prior Publication Data

US 2013/0247830 A1 Sep. 26, 2013

(51) Int. Cl.
*A01K 1/01* (2006.01)
(52) U.S. Cl.
USPC .......................................... 119/166; 119/165
(58) Field of Classification Search
USPC .................................. 119/166, 163, 165, 500
See application file for complete search history.

(56) References Cited

U.S. PATENT DOCUMENTS

| | | | | |
|---|---|---|---|---|
| 5,755,181 A | * | 5/1998 | Petkovski | 119/163 |
| 5,778,822 A | * | 7/1998 | Giffin et al. | 119/165 |
| 6,202,595 B1 | * | 3/2001 | Atcravi | 119/165 |
| 8,297,230 B2 | * | 10/2012 | Ferrer et al. | 119/165 |

* cited by examiner

*Primary Examiner* — Yvonne Abbott

(57) ABSTRACT

The present invention is a plastic litter box odor device that is an active recovery system that includes a removable hood that includes an interior perimeter pathway, an interlocking connection that removably attaches the removable hood to the device, a carbon container that is refillable and serves as a filter media to the device and an odorless exhaust vent that is an outlet point where odors are expelled away out of the device and a removable litter tray that is removably attached to the removable hood and contains cat litter used in combination with the device. The device also includes an air passage that includes odors emitted from the cat litter contained in the removable litter tray within the removable hood, a fan motor that is disposed within the removable hood and a motion sensor switch that senses incoming airflow and odors.

20 Claims, 1 Drawing Sheet

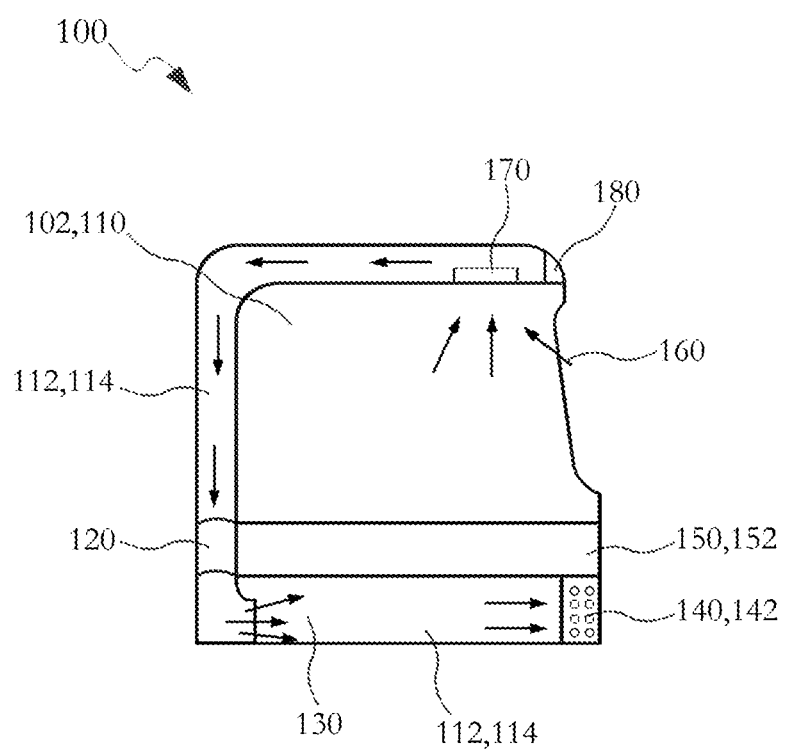

LITTER BOX ODOR DEVICE

TECHNICAL FIELD & BACKGROUND

Household cats often utilize a litter box to dispose of their waste, which may leave behind a strong odor or stench. If the litter box is not emptied on a regular basis, a powerful odor may waft throughout the house or nearby areas.

The present invention generally relates to a litter box device. More specifically, the invention is a litter box odor device.

It is an object of the invention to provide a litter box odor device that controls and filters pet odors typically from a litter box.

It is an object of the invention to provide a litter box odor device that is an active odor recovery device.

It is an object of the invention to provide a litter box odor device that utilizes a relatively less expensive carbon container in contrast to a relatively more expensive carbon filter utilized in a traditional litter box odor device to filter odors.

What is really needed is a litter box odor device that controls and filters pet odors typically from a litter box that is an active odor recovery device that utilizes a relatively less expensive carbon container in contrast to a relatively more expensive carbon filter utilized in a traditional litter box odor device to filter odors.

BRIEF DESCRIPTION OF THE DRAWINGS

The present invention will be described by way of exemplary embodiments, but not limitations, illustrated in the accompanying drawings in which like references denote similar elements, and in which:

FIG. 1 illustrates a side view of a litter box odor device, according to an embodiment of the present invention.

DETAILED DESCRIPTION OF ILLUSTRATIVE EMBODIMENTS

Various aspects of the illustrative embodiments will be described using terms commonly employed by those skilled in the art to convey the substance of their work to others skilled in the art. However, it will be apparent to those skilled in the art that the present invention may be practiced with only some of the described aspects. For purposes of explanation, specific numbers, materials and configurations are set forth in order to provide a thorough understanding of the illustrative embodiments. However, it will be apparent to one skilled in the art that the present invention may be practiced without the specific details. In other instances, well-known features are omitted or simplified in order not to obscure the illustrative embodiments.

Various operations will be described as multiple discrete operations, in turn, in a manner that is most helpful in understanding the present invention. However, the order of description should not be construed as to imply that these operations are necessarily order dependent. In particular, these operations need not be performed in the order of presentation.

The phrase "in one embodiment" is utilized repeatedly. The phrase generally does not refer to the same embodiment, however, it may. The terms "comprising", "having" and "including" are synonymous, unless the context dictates otherwise.

FIG. 1 illustrates a side view of a litter box odor device 100, according to an embodiment of the present invention.

The litter box odor device 100 includes a removable hood 110, an interlocking connection 120, a carbon container 130, an odorless exhaust vent 140, a removable litter tray 150, an air passage 160, a fan motor 170 and a motion sensor switch 180. The removable hood 110 includes an interior perimeter pathway 112 and serves as a top portion 102 of the litter box odor device 100 and assists in removing a plurality of odors 114 from the litter box odor device 100. The interlocking connection 120 removably attaches the removable hood 110 to the litter box odor device 100. The carbon container 130 is refillable and serves as a filter media to the litter box odor device 100. The carbon container 130 reduces a relatively high amount of cost to the manufacturer of the litter box odor device 100 and provides relatively greater surface area to absorb odor emitted from the litter box odor device 100 than a traditional replaceable carbon filter utilized in a traditional litter box odor device 100. The odorless exhaust vent 140 is an outlet point 142 where the filtered air 114 is expelled away out of the litter box odor device 100. The removable litter tray 150 is removably attached to the removable hood 110 by the interlocking connection 120 and contains a plurality of cat litter 152 or any other suitable substance used in combination with the litter box odor device 100. The air passage 160 includes the odors 114 emitted from the cat litter 152 contained in the removable litter tray 150 within the removable hood 110. The fan motor 170 is disposed within the removable hood 110 and pulls from the air passage 160 the odors 114 from the removable hood 110 and the interior perimeter pathway 112 and through the carbon container 130 and expelling the filtered air 114 from the odorless exhaust vent 140. The motion sensor switch 180 senses motion as the cat approaches the litter box and shuts off the fan motor for five minutes while the litter box is occupied by the cat. The litter box odor device 100 is typically made of plastic but can be made of any suitable material. The litter box odor device 100 is approximately 24" long by 18" wide and 18" high but can be other suitable dimensions as well.

The litter box odor device controls and filters pet odors typically from a litter box that is an active odor recovery device that utilizes a relatively less expensive carbon container in contrast to a relatively more expensive carbon filter utilized in a traditional litter box odor device to filter odors. The litter box odor device is a motorized odor filter system, is comprised of plastic, measures approximately 24" long by 18" wide and 18" high and houses a removable hood and litter tray. A carbon filter with an active recovery system is used to eliminate present cat odors in a traditional litter box odor device. A 12 Volt DC fan motor directs air flow through the refillable carbon container that expels the filtered air out through a vent, preventing fugitive emissions. The litter box odor device may be readily available at retail stores where pet supplies and accessories are sold. The litter box odor device features a carbon container that uses an active recovery system to remove cat odors in contrast to a passive odor recovery system. The litter box odor device is designed to be made available with a relatively larger carbon container for optimal odor absorption than a traditional litter box odor device.

While the present invention has been related in terms of the foregoing embodiments, those skilled in the art will recognize that the invention is not limited to the embodiments described. The present invention can be practiced with modification and alteration within the spirit and scope of the appended claims. Thus, the description is to be regarded as illustrative instead of restrictive on the present invention.

The invention claimed is:
1. A litter box odor device, comprising:
   a removable hood that includes an interior perimeter pathway and serves as a top portion of the litter box odor device;

an interlocking connection that removably attaches the removable hood to said litter box odor device;
a carbon container that is refillable and serves as a filter media to said litter box odor device;
an odorless exhaust vent that is an outlet point where said filtered air is expelled away out of said litter box odor device;
a removable litter tray that is removably attached to said removable hood by said interlocking connection and contains a plurality of cat litter used in combination with said litter box odor device;
an air passage that includes said odors emitted from said cat litter contained in said removable litter tray within said removable hood;
a fan motor that is disposed within said removable hood and pulls said airflow and said odors from said removable hood and said interior perimeter pathway; and
a motion sensor switch that senses incoming said airflow and said odors and activates said litter box odor device upon sensing said incoming airflow and said odors.

2. The litter box odor device according to claim 1, wherein said removable hood assists in removing a plurality of odors from said litter box odor device.

3. The litter box odor device according to claim 1, wherein said carbon container reduces a high amount of cost to a manufacturer of said litter box odor device.

4. The litter box odor device according to claim 1, wherein said carbon container provides greater surface area to absorb odor emitted from said litter box odor device than a traditional replaceable carbon filter utilized in a traditional litter box odor device.

5. The litter box odor device according to claim 1, wherein said fan motor and through said carbon container and expelling said airflow and odors from said odorless exhaust vent.

6. The litter box odor device according to claim 1, wherein said system is an active recovery system.

7. The litter box odor device according to claim 1, wherein said device is made of plastic.

8. A plastic litter box odor device, comprising:
a removable hood that includes an interior perimeter pathway and serves as a top portion of the litter box odor device;
an interlocking connection that removably attaches the removable hood to said litter box odor device;
a carbon container that is refillable and serves as a filter media to said litter box odor device;
an odorless exhaust vent that is an outlet point where said filtered air is expelled away out of said litter box odor device;
a removable litter tray that is removably attached to said removable hood by said interlocking connection and contains a plurality of cat litter used in combination with said litter box odor device;
an air passage that includes said odors emitted from said cat litter contained in said removable litter tray within said removable hood;
a fan motor that is disposed within said removable hood and pulls said airflow and said odors from said removable hood and said interior perimeter pathway; and
a motion sensor switch that senses incoming said airflow and said odors and activates said litter box odor device upon sensing said incoming airflow and said odors.

9. The litter box odor device according to claim 8, wherein said removable hood assists in removing a plurality of odors from said litter box odor device.

10. The litter box odor device according to claim 8, wherein said carbon container reduces a high amount of cost to a manufacturer of said litter box odor device.

11. The litter box odor device according to claim 8, wherein said carbon container provides greater surface area to absorb odor emitted from said litter box odor device than a traditional replaceable carbon filter utilized in a traditional litter box odor device.

12. The litter box odor device according to claim 8, wherein said fan motor and through said carbon container and expelling said airflow and odors from said odorless exhaust vent.

13. The litter box odor device according to claim 8, wherein said system is an active recovery system.

14. The litter box odor device according to claim 8, wherein said device is made of PVC.

15. A plastic or PVC litter box odor device that is an active recovery system, comprising:
a removable hood that includes an interior perimeter pathway and serves as a top portion of the litter box odor device;
an interlocking connection that removably attaches the removable hood to said litter box odor device;
a carbon container that is refillable and serves as a filter media to said litter box odor device;
an odorless exhaust vent that is an outlet point where filtered air expelled away out of said litter box odor device;
a removable litter tray that is removably attached to said removable hood by said interlocking connection and contains a plurality of cat litter used in combination with said litter box odor device;
an air passage that includes said odors emitted from said cat litter contained in said removable litter tray within said removable hood;
a 12 Volt DC fan motor that is disposed within said removable hood and pulls said airflow and said odors from said removable hood and said interior perimeter pathway; and
a motion sensor switch that senses incoming said airflow and said odors and activates said litter box odor device upon sensing said incoming airflow and said odors.

16. The litter box odor device according to claim 15, wherein said removable hood assists in removing a plurality of odors from said litter box odor device.

17. The litter box odor device according to claim 15, wherein said carbon container reduces a high amount of cost to a manufacturer of said litter box odor device.

18. The litter box odor device according to claim 15, wherein said carbon container provides greater surface area to absorb odor emitted from said litter box odor device than a traditional replaceable carbon filter utilized in a traditional litter box odor device.

19. The litter box odor device according to claim 15, wherein said fan motor and through said carbon container and expelling said airflow and odors from said odorless exhaust vent.

20. The litter box odor device according to claim 15, wherein said device is approximately 24" long by 18" wide and 18" high.

* * * * *